Oct. 6, 1925.  
G. E. SMOUSE  
TRUCK OR TRANSPORTING DEVICE  
Filed May 28, 1925  
1,556,366  
2 Sheets-Sheet 1
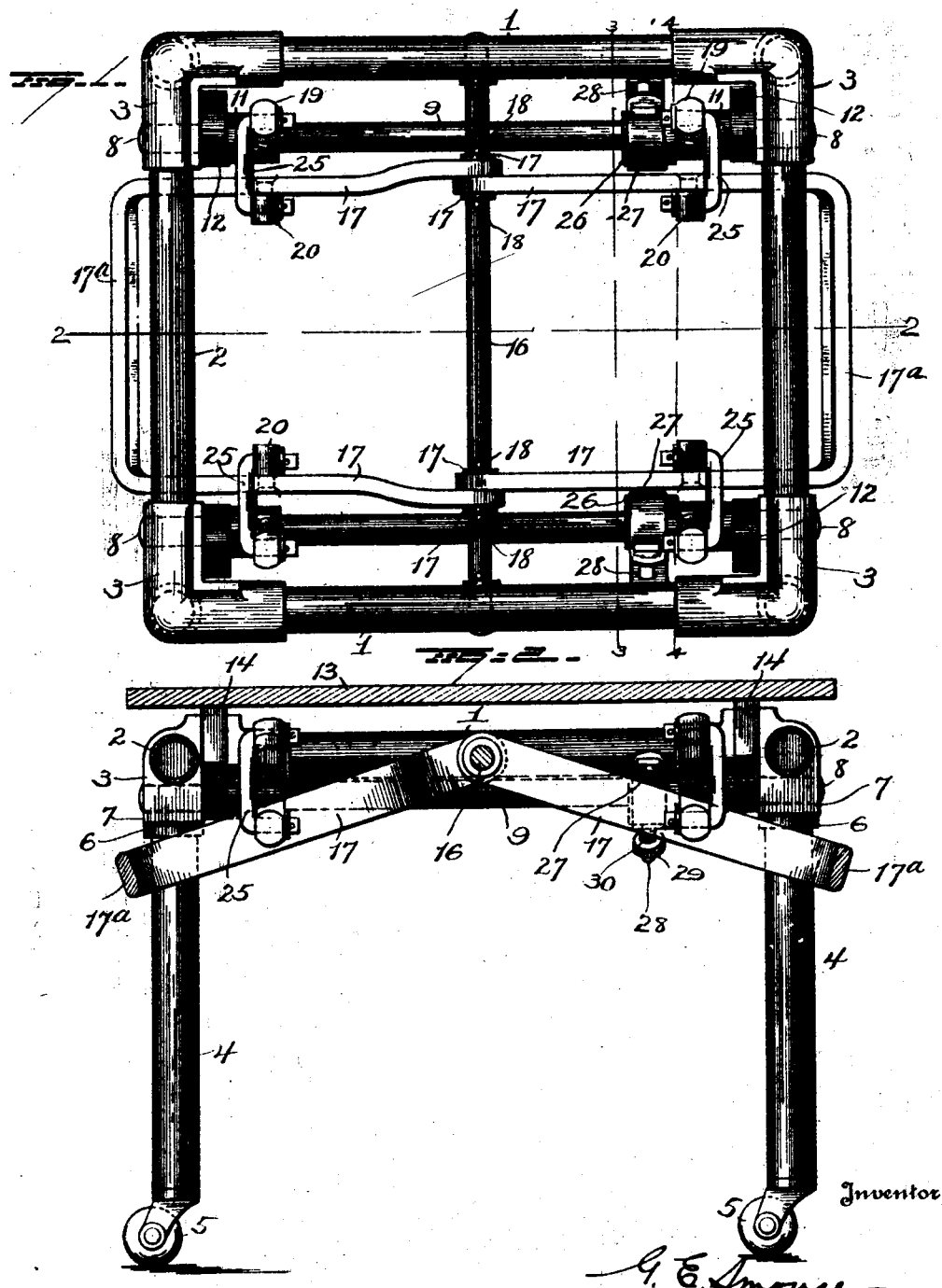
Inventor  
G. E. Smouse  
By Seymour & Dwight  
Attorneys Oct. 6, 1925.  1,556,366
G. E. SMOUSE
TRUCK OR TRANSPORTING DEVICE
Filed May 28, 1925  2 Sheets-Sheet 2
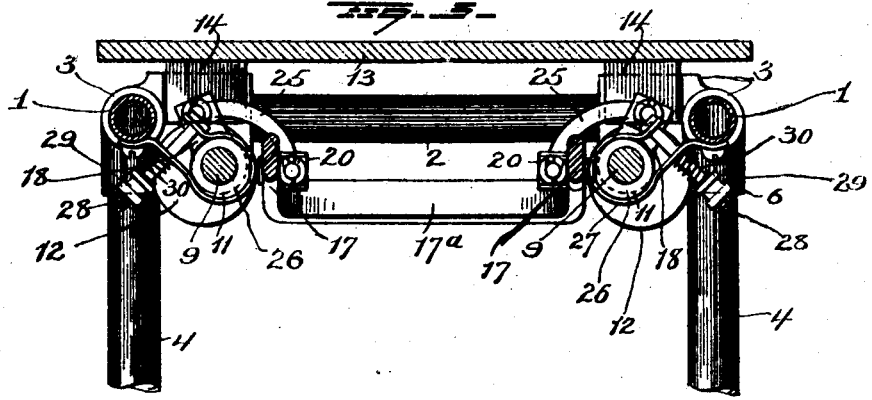
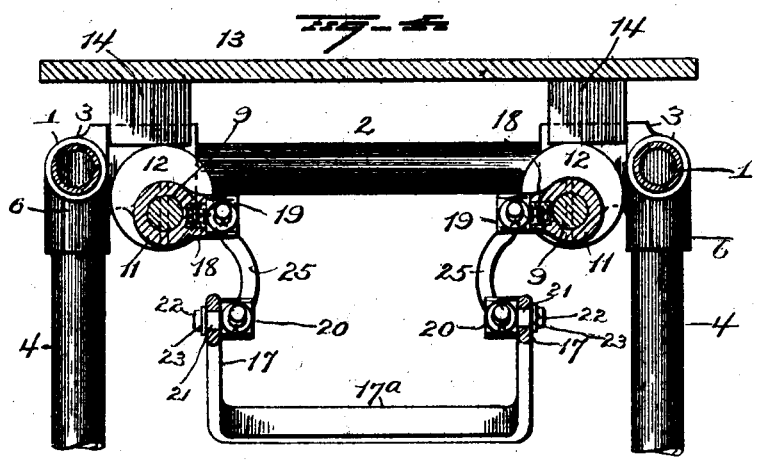
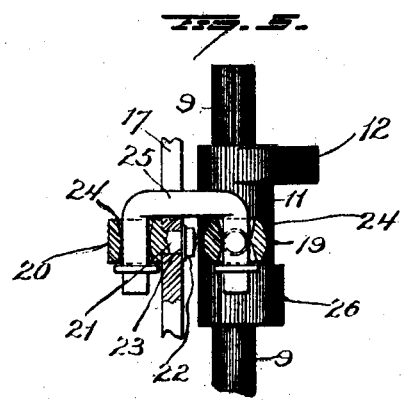
Inventor
G. E. Smouse
By Seymour & Bright
Attorneys Patented Oct. 6, 1925.

1,556,366

UNITED STATES PATENT OFFICE.

GEORGE E. SMOUSE, OF WASHINGTON, DISTRICT OF COLUMBIA.

TRUCK OR TRANSPORTING DEVICE.

Application filed May 28, 1925. Serial No. 33,438.

*To all whom it may concern:*

Be it known that I, GEORGE E. SMOUSE, a citizen of the United States, and a resident of Washington, District of Columbia, have invented certain new and useful Improvements in Trucks or Transporting Devices; and I do hereby declare the following to be a full, clear, and exact description of the invention, such as will enable others skilled in the art to which it appertains to make and use the same.

This invention relates to improvements in trucks or transporting devices and more particularly to such as are adapted for use in transferring type forms from one table or support to another,—one object of the invention being to provide improved means whereby the type receiving or supporting member of the truck or carrier may be readily raised and lowered or held in any desired position of vertical adjustment.

A further object is to provide the truck or carrier with a braking means which shall be operable automatically gradually to restrain the lowering movement of the type supporting member and thereby prevent its too rapid descent, and which shall also be operable to retain said supporting member at different positions of vertical adjustment.

A further object is to simplify and improve, in various respects, trucks or carriers of the class to which my invention relates.

With these and other objects in view, the invention consists in certain novel features of construction and combinations of parts as hereinafter set forth and pointed out in the claims.

In the accompanying drawings;

Figure 1 is a plan view of a truck or carrier embodying my improvements;

Figure 2 is a longitudinal sectional view;

Figure 3 is a sectional view on the line 3—3 of Figure 1;

Figure 4 is a sectional view on the line 4—4 of Figure 1, and

Figure 5 is a detail view, partly in section.

The frame of the truck may comprise side and end parts 1, 1 and 2, 2, (which may be tubular if desired); corner brackets 3 having sockets in which the ends of the side and end bars are secured, and legs 4 mounted on caster wheels 5,—the corner brackets 3 being formed with depending bosses 6 which receive the upper ends of said legs.

The corner brackets 3 of the frame are also provided with bearings 7 for the journals 8 of parallel shafts 9 located respectively, near respective sides of the frame.

To each of the shafts 9 near respective ends thereof, sleeves 11 are secured and carry eccentrics 12. The eccentrics 12 thus located near the corners of the frame, constitute supports for a flat type or form table or support member 13, the latter having lugs or feet 14 on its under side near its corners, to seat the table on said eccentrics. It is apparent that if the shafts 9 be rotated, the turning of the eccentrics will cause the raising or lowering of the table, and that when the table shall have been fully raised, the eccentrics will be approximately on dead centers, with relation to the lugs or feet of the table and that the latter will be enabled to sustain considerable weight without danger of accidental dropping.

A cross bar 16 is secured at its ends to the respective side bars of the frame midway between the ends of the latter, and to this cross-bar, levers 17 (preferably in the form of bails) are loosely mounted and prevented from lateral displacement by means of collars 18 and cotter pins 19 or in any other suitable manner,—said lever bails being sufficient in length to dispose their cross members 17ª somewhat beyond the ends of the frame where they will be in such position as to facilitate their ready operation.

The sleeves 11 which carry the eccentrics 12, are made with enlargements 18 and with these enlargements, studs 19 are loosely connected in such manner as to be capable of a more or less limited turning movement without becoming detached. One way in which the studs 19 may be thus loosely and rotatably connected with the sleeves 11, is by threading them into the enlargements 18 on said sleeves. Studs 20 are mounted on the parallel arms of the operating levers 17 and provided with shanks 21 passing loosely through suitable holes in lever arms and prevented from escape by means of nuts 22,—washers 23 being located between said nuts and the lever arms. The studs 19 and 20 are provided with openings 24 which are preferably made flaring in opposite directions from their centers, as shown in Figure 5. The parallel arms of an approximately U-shaped connecting link 25 pass freely through the openings in the loosely mounted studs 19—20 of each pair and thus the lever operating levers are operatively connected with the shafts 9 by means of links which have practically universal connection with the levers and the shafts.

When the operating levers are in the positions shown in Figures 2 and 3, the table with its feet resting upon the eccentrics 12, will be in its lowest position of adjustment. By now depressing the levers by the application of power to either of them, motion will be imparted, through the sleeves 11, studs 19, 20 and links 25, to the shafts 9 so as to rotate the latter and turn the eccentric 12 and raising the table 13 from the position shown in Figure 3 to the position shown in Figure 4. It is apparent that if the operating levers 17 be now raised, the table will be lowered by reverse movement of the supporting eccentrics 12.

It is desirable that accidental or too rapid descent of the table be prevented and also that the table be held at somewhat different positions of vertical adjustment, whereby the table may be held in such position that it shall facilitate the transfer of the type forms from one work or assembling table or device to another, especially when there is some degree of variance in the height of the work or assembling tables. In order that these results may be effectually accomplished, I provide braking means which will be applied gradually during the descent of the table and gradually released during the ascent of the table, both the application and release of the braking means being accomplished automatically when the levers are operated to raise or to lower the table.

In the embodiment of the invention shown in the drawing, eccentric brake wheels or members 26 are secured to the two operating shafts 9, and this may be readily accomplished by forming such eccentric brake wheels or member or one sleeve 11 on each shaft. A brake band or shoe 27 cooperates with each eccentric brake wheel,—one end of each brake band or shoe being secured to one of the side bars 1 of the frame. A headed rod 28 passes through the other end portion of the band or shoe and also through and beyond a portion of band between the brake wheel and the attachment of the band to the side bar of the frame. A nut 29 is threaded on each brake rod 28 and a spring 30 is located on each brake rod between said nut and the brake band. It is apparent that with such construction, rotation of the operating shafts in a direction to lower than the table or type supporting member, the brakes will be gradually applied and that during the reverse rotation of said shafts, (to raise the table or type supporting member) the brakes will be released.

Having fully described my invention what I claim as new and desire to secure by Letters Patent, is:—

1. In a transporting device of the character described, the combination with a frame, a support member, and operating means for raising and lowering the support member of braking means connected with said operating means, said braking means comprising an eccentric wheel carried by a moving part of said operating means and a brake band engaging said eccentric brake wheel and connected with the frame, whereby the braking means will be gradually applied during the lowering of the support member and gradually released during the raising of the support member.

2. In a transporting device of the character described, the combination with a frame and a support member, of operating means for raising and lowering the support member, said operating means including shafts, means on said shaft cooperable with said support member to raise the same or to permit it to lower and means for turning said shaft, an eccentric brake wheel movable with said shafts, and a spring-pressed brake band connected with the frame and engaging said eccentric brake wheel.

3. In transporting means of the character described, the combination with a frame, and a support member, of shafts mounted in said frame, eccentrics carried by said shafts and cooperable with the support member to raise the same or permit its descent, an operating lever connected with said shafts, eccentric brake wheels secured to said shafts, and brake bands secured to the frame and engaging said eccentric brake wheels, whereby the brake bands will be applied during lowering of the support member and released during the raising of the support member.

4. In transporting means of the character described, the combination with a frame, and a support, of two shafts mounted in said support, eccentrics carried by said shafts and cooperable with the support to raise the same or permit it to descend, a lever connected with said shafts for turning them, an eccentric brake wheel carried by each shaft, brake bands secured to said frame and engaging said eccentric brake wheels, rods connected with the free end portions of said brake bands and passing freely through intermediate portions of said bands, adjustable members on said rods, and springs on said rods between said adjustable members and the brake bands.

5. In transporting means of the character described, the combination of a frame, a support member, shafts mounted in the frame, eccentrics on said shafts and cooperable with the support member to raise the same or permit the same to descend, and a pivoted lever, studs mounted on said lever, loosely mounted studs carried by said shafts, connecting links loosely engaging the studs on the lever and the studs on the shafts.

6. In transporting means of the character described, the combination with a frame, a support member, shafts mounted in the frame, and eccentrics on said shafts and cooperable with the support member, of a pivoted lever, studs carried by said lever said studs having flaring openings, loosely mounted studs carried by said shafts and having flaring openings, and connecting links having parts mounted in the flaring openings of the studs on the lever and the studs on the shafts respectively.

7. In transporting means of the character described, the combination of a frame, a support member, shafts mounted in the frame, eccentrics carried by said shafts and cooperable with the support member, an intermediate cross bar secured to the frame, two levers loosely mounted on said cross bar, loosely mounted studs carried by said shafts near respective ends thereof, two studs carried by each lever, and links loosely connecting the studs on the levers with the studs on the shafts.

In testimony whereof, I have signed this specification.

GEORGE E. SMOUSE.